United States Patent
Resler et al.

(10) Patent No.: US 9,971,183 B1
(45) Date of Patent: May 15, 2018

(54) HIGH POWER ADAPTIVE OPTIC SYSTEM AND COMPONENTS THEREIN

(71) Applicant: Raytheon Company, Waltham, MA (US)

(72) Inventors: Daniel P. Resler, Carlisle, MA (US); Andrew D. W. McKie, Northborough, MA (US); Linda A. Palmaccio, Carlisle, MA (US)

(73) Assignee: Raytheon Company, Waltham, MA (US)

( * ) Notice: Subject to any disclaimer, the term of this patent is extended or adjusted under 35 U.S.C. 154(b) by 0 days. days.

(21) Appl. No.: 15/612,268

(22) Filed: Jun. 2, 2017

(51) Int. Cl.
*G02F 1/1343* (2006.01)
*G02F 1/1333* (2006.01)
*G02F 1/29* (2006.01)

(52) U.S. Cl.
CPC .......... *G02F 1/133382* (2013.01); *G02F 1/29* (2013.01); *G02F 2201/124* (2013.01); *G02F 2203/18* (2013.01)

(58) Field of Classification Search
CPC ................. G02F 1/133382; G02F 1/29; G02F 2201/124; G02F 2203/18
USPC .......................................................... 349/193
See application file for complete search history.

(56) References Cited

U.S. PATENT DOCUMENTS

| | | | |
|---|---|---|---|
| 4,943,709 A | 7/1990 | Grinberg et al. | |
| 5,090,795 A | 2/1992 | O'Meara et al. | |
| 6,490,076 B2 | 12/2002 | Pepper | |
| 6,839,108 B1* | 1/2005 | Hirakata | G02F 1/133553 349/114 |
| 7,215,472 B2 | 5/2007 | Smith et al. | |
| 7,492,502 B2* | 2/2009 | Chui | B81C 1/00142 359/290 |
| 9,477,135 B1 | 10/2016 | Uyeno et al. | |
| 2005/0212999 A1 | 9/2005 | Yang et al. | |
| 2012/0081621 A1 | 4/2012 | Dorschner et al. | |
| 2015/0008465 A1 | 1/2015 | Saenger Nayver et al. | |
| 2015/0146139 A1 | 5/2015 | Smith et al. | |
| 2016/0077333 A1 | 3/2016 | Collins | |
| 2017/0293151 A1* | 10/2017 | Zha | G02B 27/2214 |

OTHER PUBLICATIONS

Chulwoo Oh, Jihwan Kim, John F. Muth, Michael J. Escuti, A new beam steering concept: Risley gratings, SPIE vol. 7466, 74660J, 2009, 8 pages.

Chulwoo Oh, Jihwan Kim, John F. Muth, Michael J. Escuti, High-Throughput Continuous Beam Steering Using Rotating Polarization Gratings, IEEE, 2010, 3 pages.

* cited by examiner

*Primary Examiner* — Hoan C Nguyen
(74) *Attorney, Agent, or Firm* — Daly, Crowley, Mofford & Durkee, LLP

(57) ABSTRACT

An assembly having a liquid crystal molecule section, a reflector section, disposed on the liquid crystal molecule section, having a stack of dielectric layers having alternating higher and lower indices of refraction; and an array of electrode sections disposed between a pair of the dielectric layers, one of said pair of dielectric layers having a higher index than the other one of said pair of dielectric layers. The electrodes in the array are interdigitated electrode for producing electric fields parallel to the array. The reflector section is disposed between the liquid crystal molecule section and a thermally conductive substrate.

21 Claims, 9 Drawing Sheets

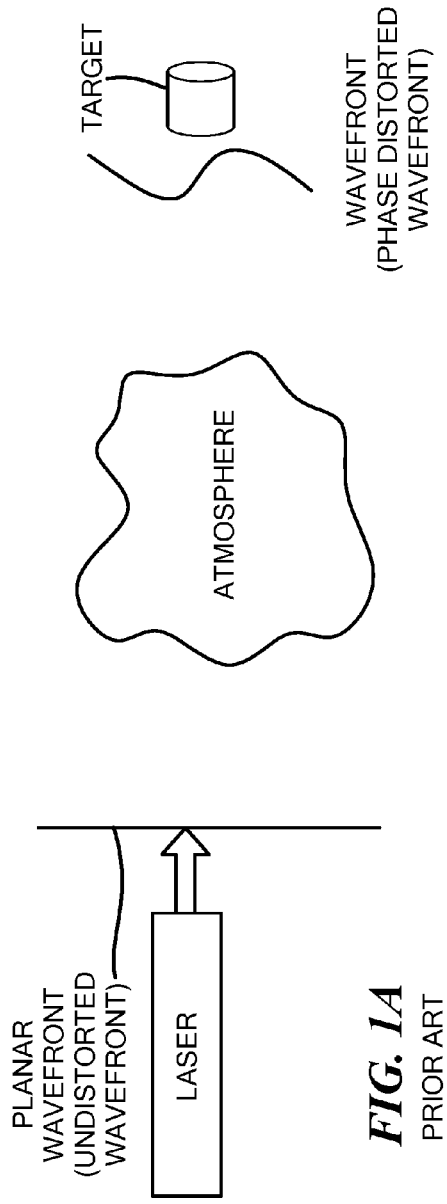
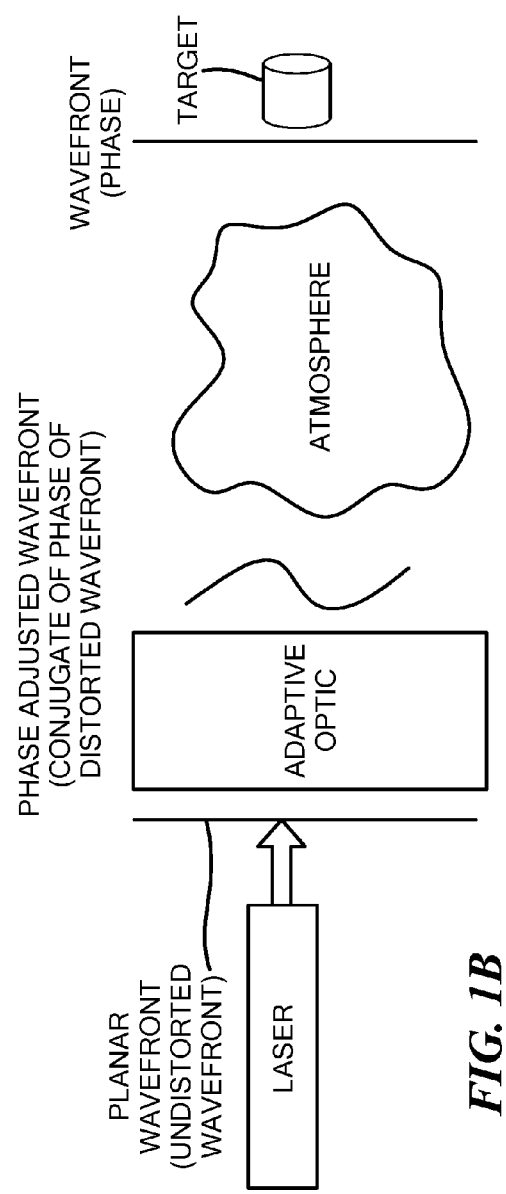
FIG. 1A PRIOR ART
FIG. 1B PRIOR ART

FIG. 2
FIG. 2A
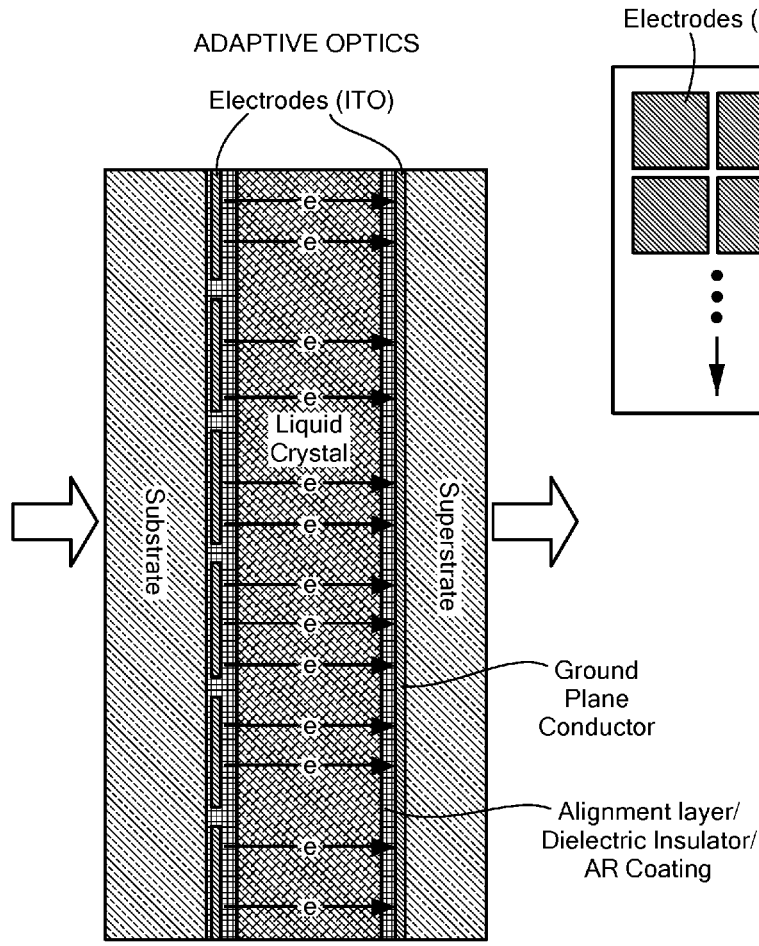
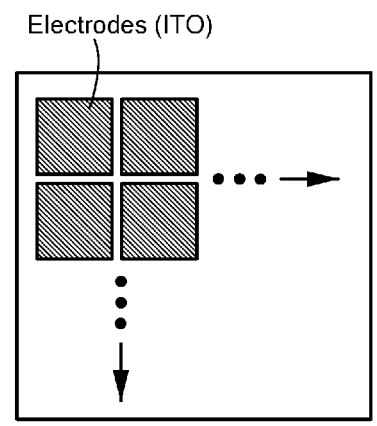

HIGH POWER ADAPTIVE OPTIC SYSTEM AND COMPONENTS THEREIN

TECHNICAL FIELD

This disclosure relates generally to adaptive optic systems and more particularly to high power adaptive optic systems and components used therein.

BACKGROUND

As is known in the art, adaptive optics is an essential component for optical aberration correction in applications where optical energy is transmitted through an aberration producing medium, such as the atmosphere. Thus, while the energy leaving a laser is typically desired to have a planar wavefront (where all wavelets in the energy are in-phase) to produce maximum power on a distant target in the theoretical absence of medium produced aberrations (FIG. 1A), medium produced aberrations produce different phase delays to the wavelets thereby distorting the wavefront resulting in less than maximum power being produced at the target (FIG. 1B). Adaptive optics is sometimes used to correct for these undesirable atmospheric aberrations producing effects. Many current methods are mechanical in nature (deformable mirrors, MEMs) and often cannot handle the power levels envisioned for high energy laser applications.

As is also known in the art, an adaptive optic liquid crystal device is useful as an optic component in many applications. One such adaptive optic is shown in FIG. 2 to include liquid crystal molecules disposed between a pair of alignment layers (which induce uniform planar alignment of the liquid crystal near the surfaces of the pair of alignment layers), the pair of alignment layers being disposed between a pair of electrode layers; here an array (FIG. 2A) of Indium Tin Oxide (ITO) optically transparent electrodes and a ITO ground plane conductor, which, are disposed between on a substrate and a superstrate, respectively, as shown in FIG. 2. The input beam of light from the laser passes successively through a transparent substrate (having electronics for producing control signals for the electrodes), an array of transparent electrodes, liquid crystal molecules, a transparent ground plane conductor, and a superstate to produce an output beam, as indicated. The each one of the electrodes in the array is associated with a corresponding pixel, or wavelet, of the output beam. Each one of the electrodes is driven by an AC voltage. The voltages produce electric fields (e) through the liquid crystal molecules in a direction perpendicular to the surface of the array of electrodes and the ground plane conductor to change the orientation of the liquid crystal molecules in the corresponding wavelet. The relative phases of the wavelets are adjusted in accordance with the relative magnitude of the voltages fed to the electrodes and thus the adaptive optic may be used to modify the shape of the wavefront of the laser beam to correct for atmospheric aberrations. For example, while many techniques have been used and suggested to determine the requisite phase shifts controlled by the electrodes, one technique measures the power at the target and varies the phase shift until maximum power is received at the target. Thus, in effect the wavefront produced by the adaptive optic is the conjugate of the phase shifts produced by the atmospheric aberrations. Unfortunately, the electrodes are not 100 percent transmissive and absorb some light energy. For example, common electrode material ITO absorbs close to 1% power. Further, heat generated within the ground plane conductor must be removed; and in the system of FIG. 2, such heat must be removed from the outer edges of the ground conductor.

SUMMARY

In accordance with the present disclosure, an assembly is provided having: a liquid crystal molecule section comprising liquid crystal molecules; a reflector section, disposed on the liquid crystal molecule section, comprising a stack of dielectric layers having alternating higher and lower indices of refraction; and, an array of electrode sections disposed within the stack of dielectric layers.

In one embodiment, one of the dielectric layers having the higher indices of refraction is above the array of electrode sections and one of the dielectric layers having the lower indices of refraction is below the array of electrode sections.

In one embodiment, the array of electrode sections is disposed between a pair of the stack of dielectric layers, one of said pair of dielectric layers having a higher index than the other one of said pair of dielectric layers.

In one embodiment, a thermally conductive substrate is provided, the reflector section being disposed between the liquid crystal molecule section and the thennally conductive substrate.

In one embodiment, each one of the electrode sections comprises interdigitated electrodes for producing an electric field between pairs of the interdigitated electrodes.

In one embodiment, the array of electrode sections is disposed in a plane.

In one embodiment, the electric field is has component parallel to the plane.

In one embodiment, the array of electrode sections has a plurality of the dielectric layers above the array.

In one embodiment, the array of electrode sections has a plurality of the dielectric layers below the array.

In one embodiment, the array of electrode sections has a plurality of the dielectric layers above the array and a plurality of dielectric layers below the array.

In one embodiment, an adaptive optics system is provided having: an adaptive optics assembly, comprising: a liquid crystal molecule section comprising liquid crystal molecules disposed between a pair of alignment layers; a reflector section, disposed on the liquid crystal molecule section, comprising a stack of dielectric layers having alternating higher and lower indices of refraction; and, an array of electrode sections disposed within of the stack on dielectric layers; and a control section for producing electric signals across the array of electrode sections with magnitudes in accordance with a control signal fed to the control section, such electric signals producing electric fields passing through the liquid crystal molecules along a direction parallel to the array of the electrode sections to orientate the molecules in the a corresponding section of liquid crystal molecules in accordance with magnitudes of the control signal fed to the control section.

In one embodiment, the system includes; a source of light, such light being directed though the adaptive optics assembly to a target; and a sensing system for detecting aberration of the light at the target and for producing the control signal the relative phase shift light to reduce the aberration of the light at the target.

With such an arrangement, the use of an the array of electrode sections disposed in a plane for producing the electric field parallel to the plane eliminates the upper superstate electrode along with any associated absorption. The inventors have discovered that the array of electrode sections should be disposed between a pair of the dielectric layers, one of said pair of dielectric layers having a higher index than the other one of said pair of dielectric layers; the particular one of the layers being selected to provide minimum optical losses and optical diffraction and still enable an effective electric field strength to be produced within the liquid crystal molecule section without excessively high voltages being applied to the electrodes in the electrode sections. The optical stack design allows<0.1% absorption to be achieved and any residual heating is easily removed by face cooling the thermally conductive substrate. Also, optical diffraction from the electrodes is minimized by their being individually narrow and spaced as wide as possible taking into consideration available space.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIGS. 1A and 1B are diagrams useful in understanding the effect of medium aberrations and correction thereof by adaptive optics according to the PRIOR ART;

FIG. 2 is a diagrammatical cross sectional sketch of an adaptive optics assembly adapted for use in an adaptive optics according to the PRIOR ART;

FIG. 2A is a plan view sketch of an array of electrodes used in the adaptive optics of FIG. 2 according to the PRIOR ART;

Like reference symbols in the various drawings indicate like elements.

DETAILED DESCRIPTION

Figure 3:
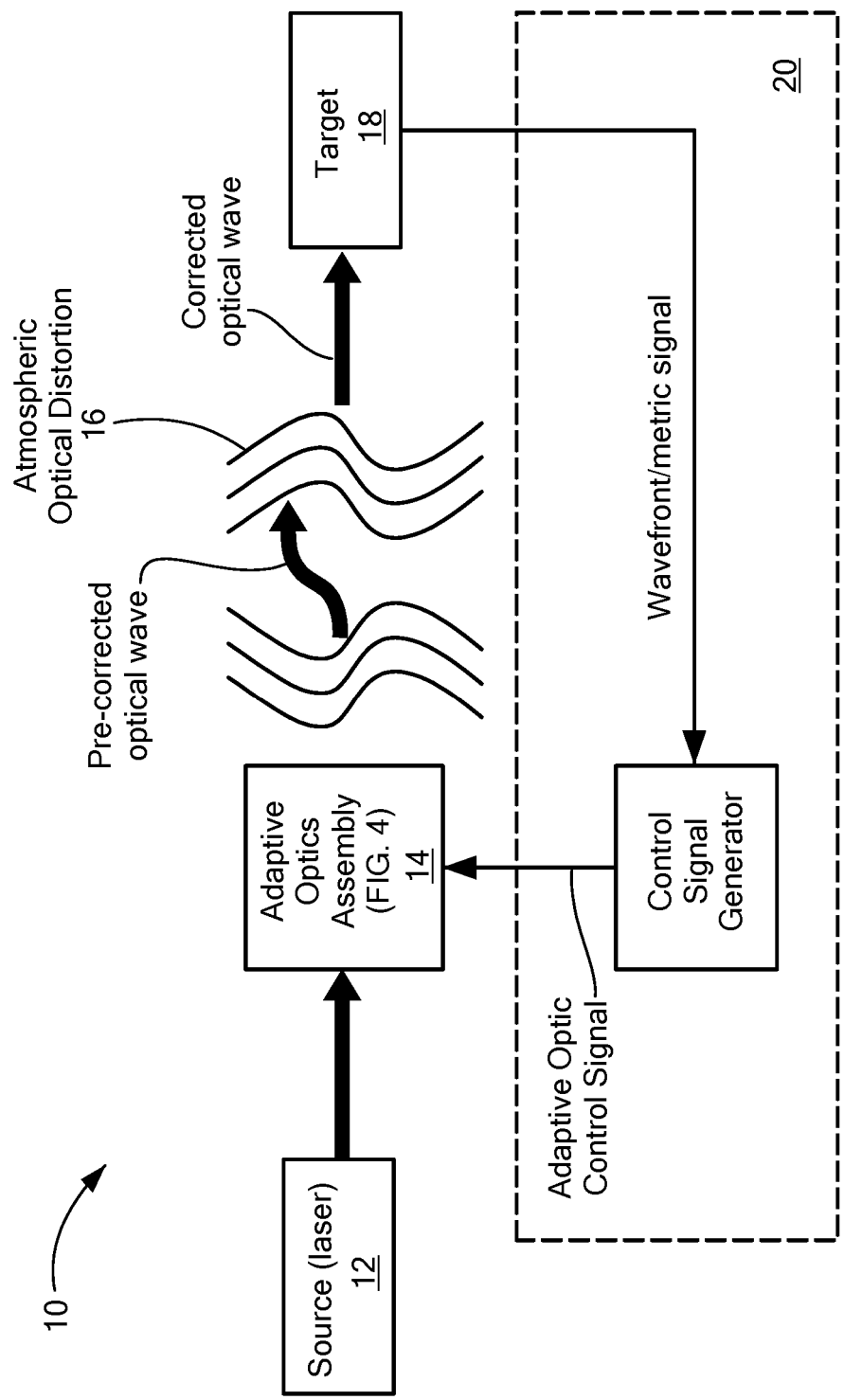
FIG. 3 is a block diagram of an adaptive optics system according to the disclosure.

Referring now to FIG. 3, a block diagram of an adaptive optics system 10 is shown to include a source of light 12, here a laser, the light being directed though an adaptive optics assembly 14 (FIG. 4) and then through a medium 16, here the atmosphere, to a target 18. A sensing system 20 is provided for detecting aberration of the light at the target 18, here for example power received by the target 18, and for producing a control signal (adaptive optics control signal) for the adaptive optics assembly 14 to control relative phase shifts across the adaptive optics assembly 14 to reduce the aberration of the light at the target 18; here, for example, by adjusting the relative phase shifts to maximize the power received at the target 18. Thus, in effect the wavefront produced by the adaptive optics assembly 14 is the conjugate of the phase shifts produced by the atmospheric aberrations.

Figure 4:
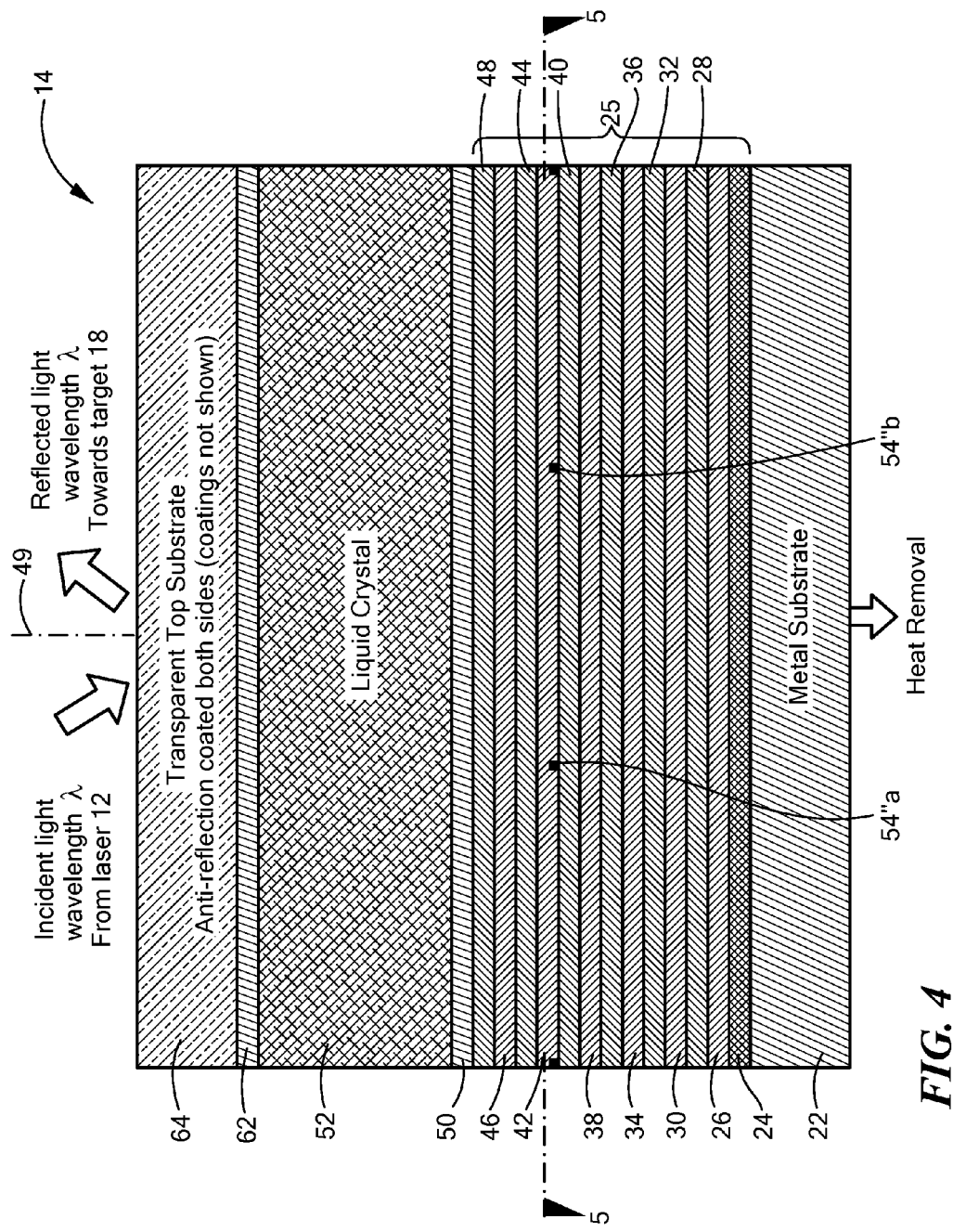
FIG. 4 is a diagammatical, cross sectional sketch of an adaptive optics assembly adapted for use in an adaptive optics of FIG. 3 according to the disclosure.

Referring now to FIG. 4, the adaptive optics assembly 14 is shown to include a metal, heat conducting substrate 22, here for example, copper, has formed thereon, here for example by evaporation, a metal, here conducting layer 24, here for example, aluminum; it being understood that this layer 24 is optional.

A reflector section 25 is disposed on the upper surface of the aluminum layer 24, or if not used, on the upper surface of the heat conducting substrate 22, as shown. The reflector section 25 comprises a stack of interleaved dielectric layers 26-48 having different indices of refraction, layers of first indices of refraction being disposed between pairs of layers having second indices of refraction lower than the first indices of refraction; More particularly, layer 26, 30, 34. 38, 42, and 42 have here, for example, silicon dioxide having a low index of refraction, here 1.5, and layers 28, 32, 34, 36, 40, 44 and 48 are here for example titanium dioxide ($TiO_2$) having a higher index refraction than layers 26, 30, 34, 38, 42, and 42, here for example an index of refraction of 2.7. The thickness of the layers 26-48 are each $\lambda/4$ where $\lambda$ is the wavelength of the light produced by the source of light 12 (FIG. 4), at the used angle of incidence, here, 22.5 degrees from an axis normal 49 to the surfaces of the layers 26-48. The layers 26-48 are formed by, for example, ion beam sputter deposition.

Figure 5:
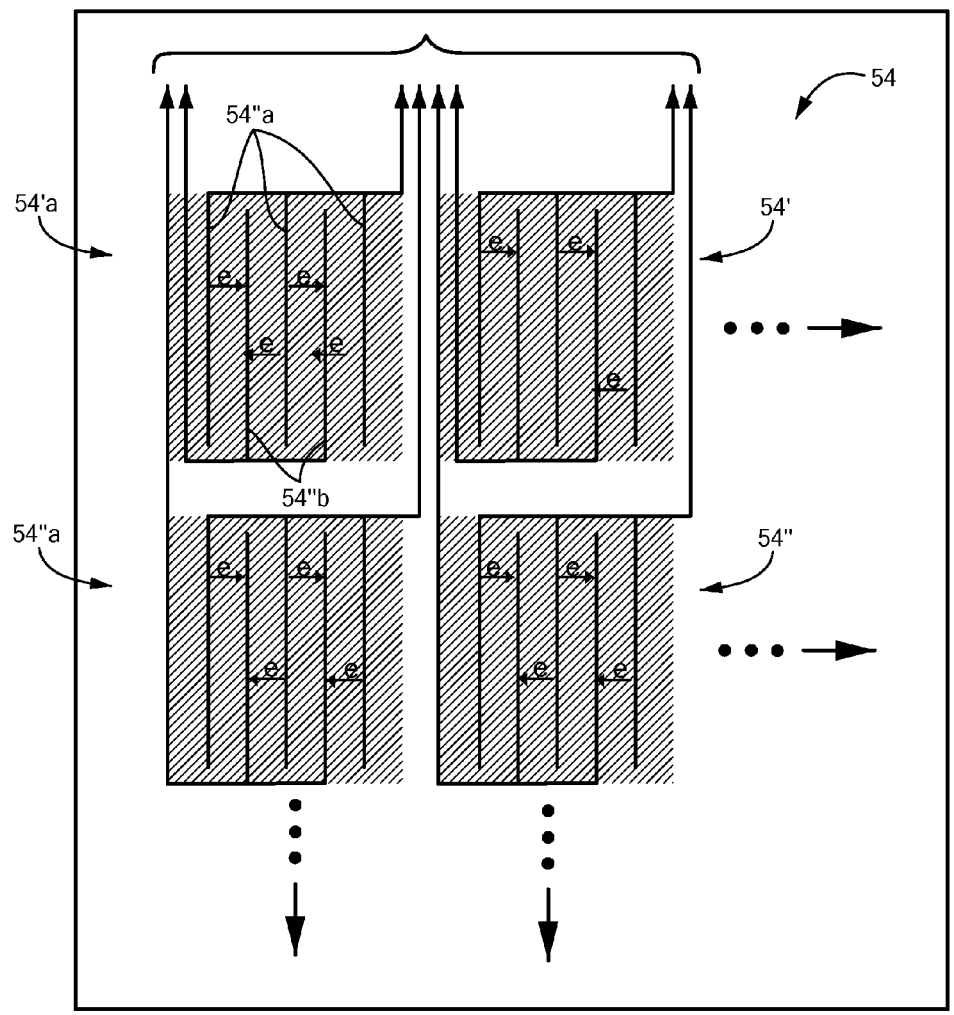
FIG. 5 is a plan view of a portion of an array of an array of electrode sections used in the electronics adaptive optics of FIG. 3 according to the disclosure.
Figure 6A:
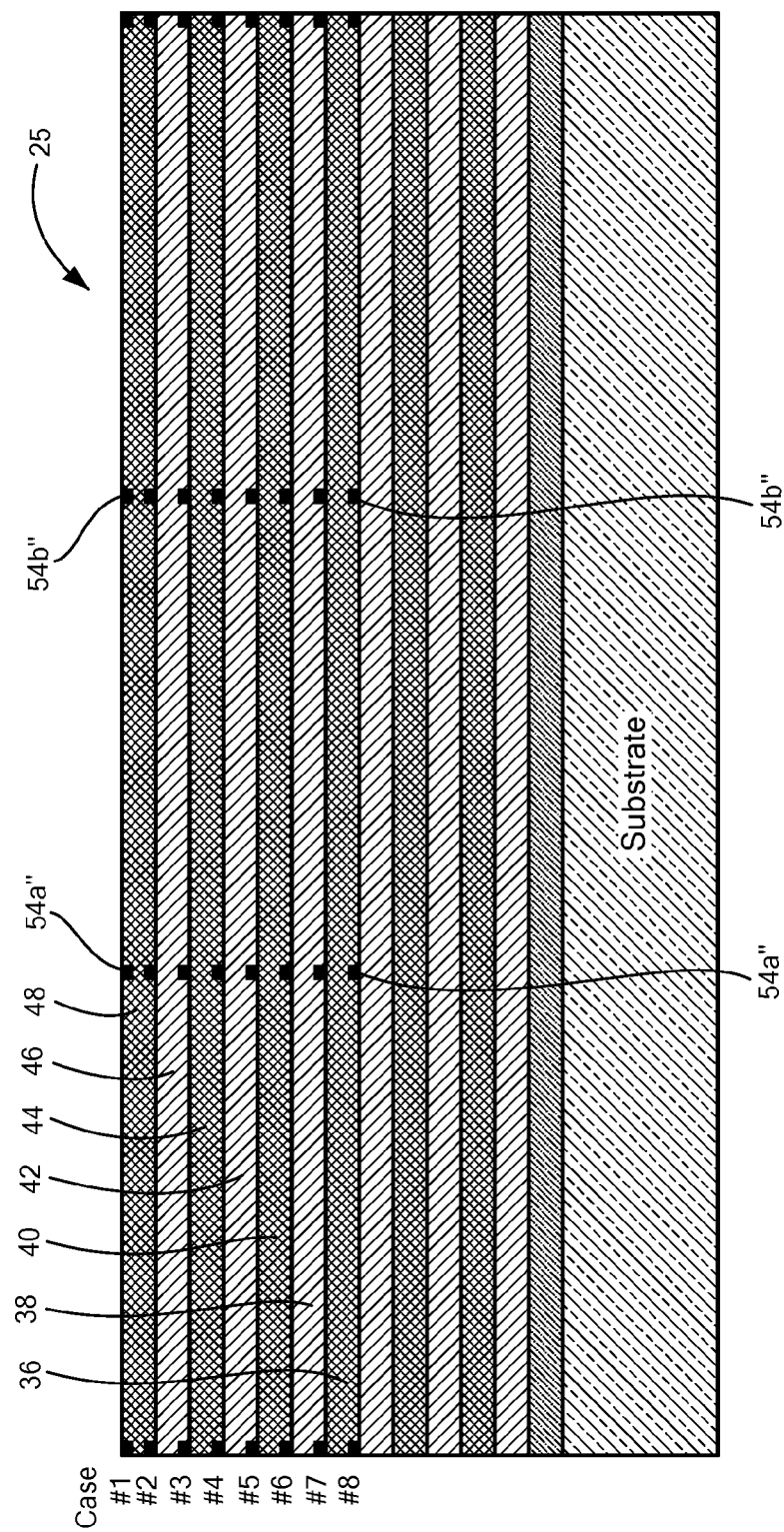
FIGS. 6A and 6B are diagrams useful in understanding embedding an array of electrodes within on a selected one of a stark of dielectric layers of a reflector section used in the adaptive optics assembly of FIG. 3 according to the disclosure.
Figure 6B:
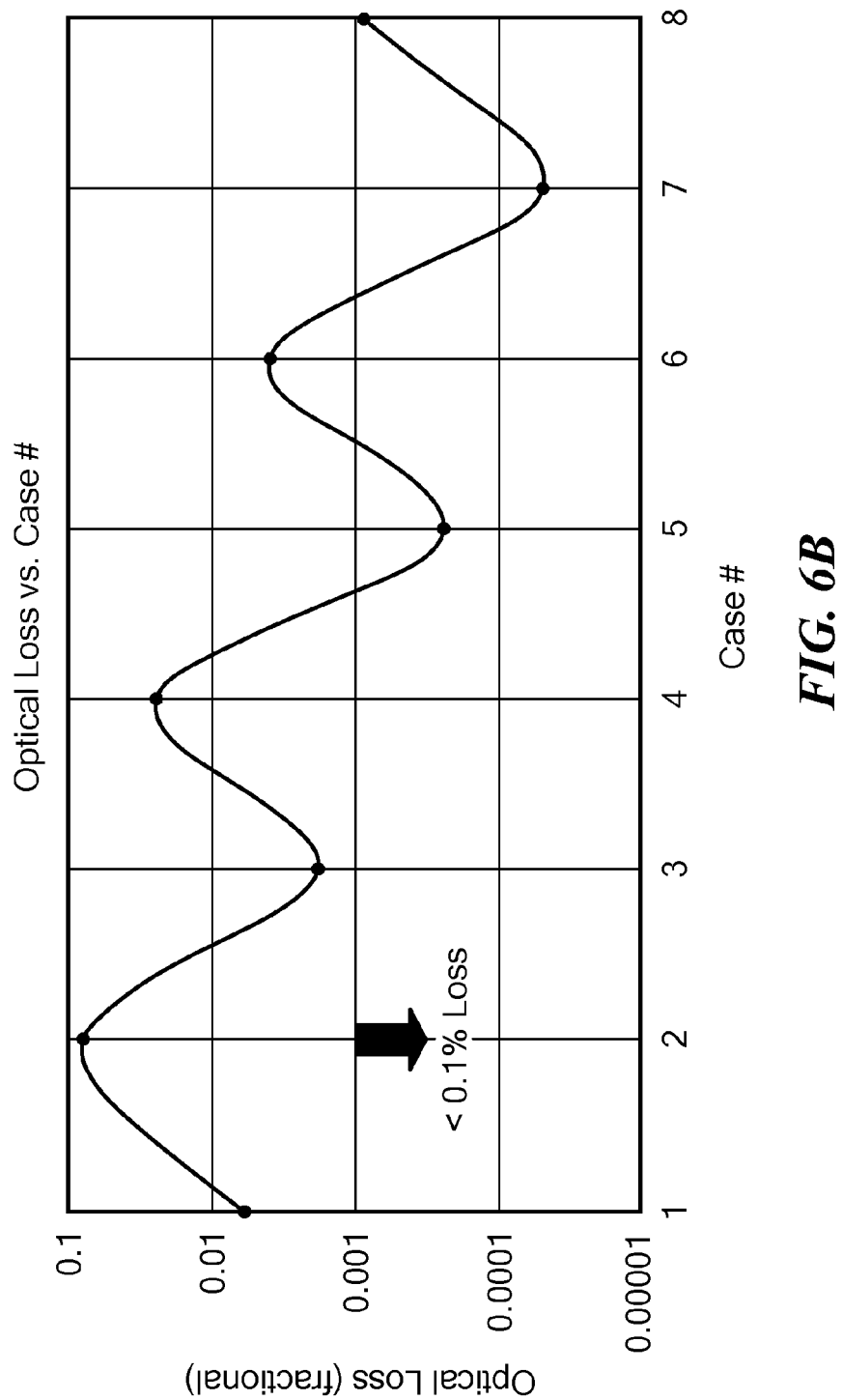

It is to be noted that a planar array 54 of identical electrode sections 54' (a portion being shown in FIG. 5) is arranged in a matrix of row and columns formed on one of the layers 26-48, here on layer 40 (FIG. 4) using conventional lithographic processing, the plan view being along line 5-5 in FIG. 4. Here, each one of the electrode sections 54' includes interdigitated electrodes 54"a, 54"b for producing an electric field (e) between pairs of the interdigitated electrodes 54"a, 54"b (in the plane of the array of interdigitated electrodes 54"a, 54"b) as shown for an exemplary one of the electrode sections 54', here, for example, electrode sections 54'a. Thus, here the electric field (e) has its primary parallel to the surface of the planar array 54. The particular one of the layers 26-48 upon which the planar array 54 is formed is selected is a result of a tradeoff between optical losses, such as optical absorption and diffraction, from the electrodes and positioning the electrodes as close as possible to the liquid crystal molecules to obtain an effective electric field (e) through the liquid crystal molecules without excessively high voltages being applied to the electrodes of the planar array 54. More particular, here a software program called GSovler by Grating Solver Development Company 800 Clearlake Drive Allen, Tex. 75002 was used to calculate optical loss as a function of the one of the dielectric layers 36-48 upon which the electrodes 54a", 54b" were placed, as shown in FIG. 6A, Here, eight cases; Cases #1-190 8, as shown in FIG. 6A were analyzed by the GSolver software. The results are shown in FIG. 6B. Since the further away from the liquid crystal molecule section 52 the electrodes are placed the higher the voltage required between the electrodes 54a", 54b" to produce the requisite electric field (e) through the liquid crystal molecule section 52, the electrodes 54a", 54b", are placed on the one of the dielectric layers 36-48 which will produce a loss low enough to still result in sufficient laser power being produced at the target with a voltage level high enough for proper system operation (electric field production through the liquid crystal molecule section 52). Thus, in this example, a 0.1 percent loss is acceptable and will, for the particular laser power, result in a proper laser power at the target and will require an acceptable voltage level for the electrodes 54$a''$, 4$b''$.

Figure 4A:
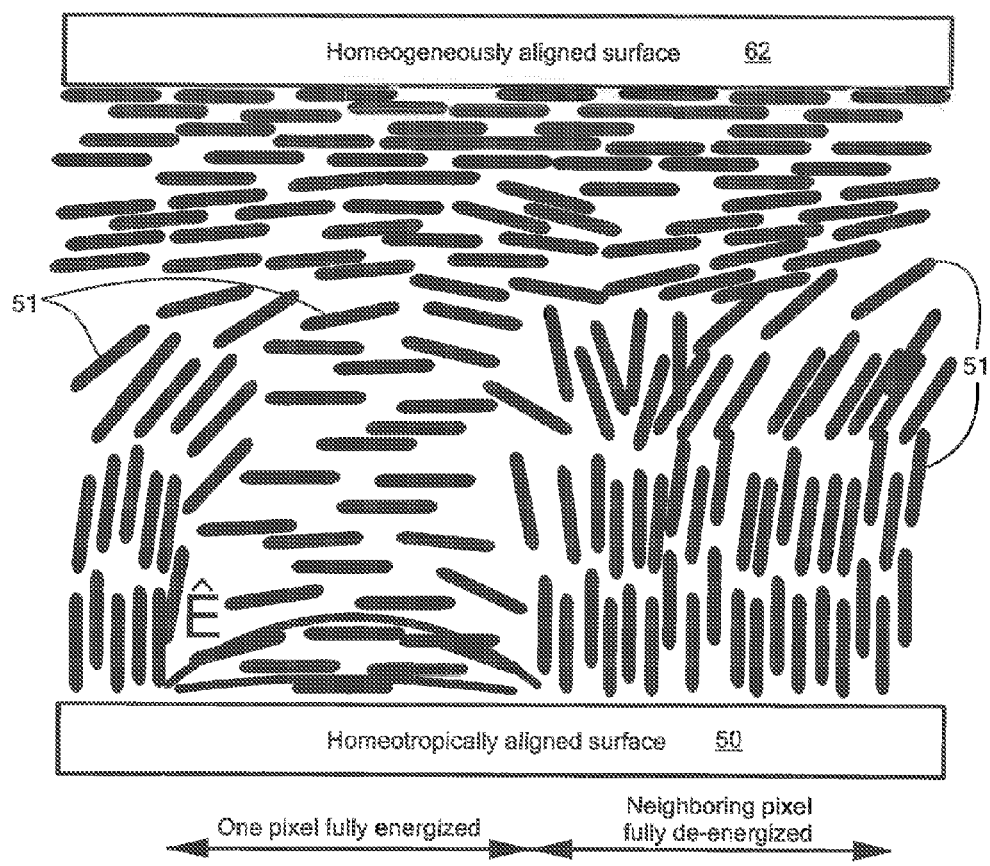
FIGS. 4A and 4B are diagrams showing elongated nematic crystal molecules aligned parallel to a homogeneously aligned surface and elongated nematic liquid crystal molecules aligned perpendicular to a homeotropically aligned surface, respectively.
Figure 4B:
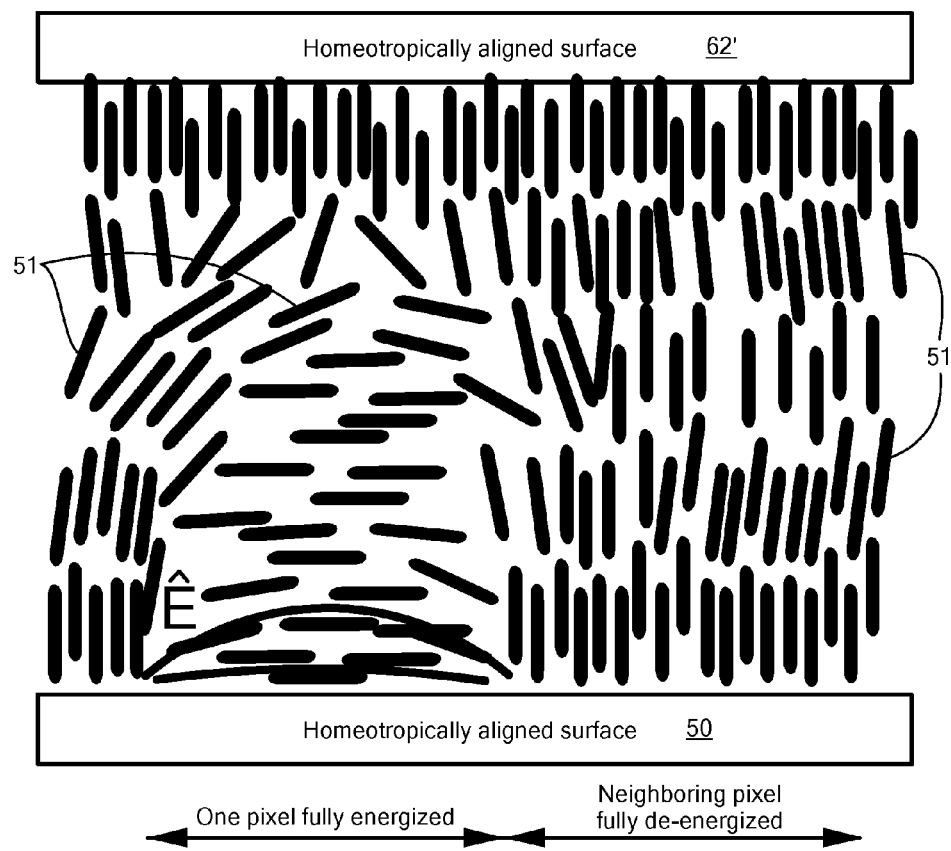

Referring again to FIG. 4, a liquid crystal molecule section 52 comprising, here for example, nematic liquid crystal molecules is disposed between a pair of alignment layers 50, 62; of alignment layer 50 being deposed on the reflector section 25, more particularly, alignment layer 50 is disposed on dielectric layer 48. While the alignment layer 62 may be either a homogeneously aligned surface, whereby the elongated nematic liquid crystal molecules 51 are aligned parallel to the homogeneously aligned surface 62 as shown in FIG. 4A or a homeotropically aligned surface 62' whereby the elongated nematic liquid crystal molecules 51 are aligned perpendicular to the homeotropically aligned surface 62' as shown in FIG. 4B, the alignment layer 50 is a homeotropically aligned surface, whereby the elongated nematic liquid crystal molecules 51 are aligned perpendicular to the homeotropically aligned surface 62 as shown in FIGS. 4A and 4B in the absence of an electric (e) field from identical electrode sections 54' and rotate towards a direction parallel; to the surface of layer 50 in the presence of an electric field from the identical electrode sections 54' as shown in FIG. 4A and 4B. The reflector section 25 is "bonded" to the substrate by the deposition process. The liquid crystal molecule section 52 is merely contained by the substrate 22 and a top, transparent substrate (or superstrate) 64, superstate, as it is a liquid.

The top, transparent substrate (or superstate) 64, here having an anti-reflection coating (not shown) on both sides is affixed, here with any suitable glue, about its periphery to the -substrate 22, Thus, the sensing system 20 detects aberration of the light at the target 18, here for example power received by the target 18, and for producing a control signal (adaptive optics control signal) for the adaptive optics assembly 14 to control relative phase shifts across the adaptive optics assembly 14, more particularly, the planar array 54 of identical electrode sections 54', each one of the electrode sections 54' being associated with, and producing an electric field in, a corresponding region of the molecules in the liquid crystal molecule section 52, to reduce the aberration of the light at the target 18; here, for example, by adjusting the relative phase shifts to maximize the power received at the target 18. Thus, in effect the wavefront produced by the adaptive optics assembly 14 is the conjugate of the phase shifts produced by the atmospheric aberrations.

A number of embodiments of the disclosure have been described. Nevertheless, it will be understood that various modifications may be made without departing from the spirit and scope of the disclosure. For example, the array of electrode sections may be disposed within one of the dielectric layers in the stack of dielectric layers for example by forming an initial lower portion of such dielectric layer followed by forming the electrode sections 54' on the lower portion of such dielectric layer and then completing dielectric layer over the formed electrode sections 54'. Further, the polymer network liquid crystal (PNCC) may be used instead of nematic liquid crystal. Also, the number of layers in the reflector section 25 can he lesser or greater, and/or different materials for the reflector can be used, and/or the electrodes may be placed at different locations within the reflector section 25. Accordingly, other embodiments are within the scope of the following claims.

What is claimed is:

1. An assembly, comprising:
   a liquid crystal molecule section comprising liquid crystal molecules;
   a reflector section, disposed on the liquid crystal molecule section, comprising a stack of dielectric layers having alternating higher and lower indices of refraction; and,
   an array of electrode sections disposed within the stack of dielectric layers.

2. The assembly recited in claim 1 wherein one of the dielectric layers having the higher indices of refraction is above the array of electrode sections and one of the dielectric layers having the lower indices of refraction is below the array of electrode sections.

3. The assembly recited in claim 1 wherein the array of electrode sections is disposed between a pair of the stack of dielectric layers, one of said pair of dielectric layers having a higher index than the other one of said pair of dielectric layers.

4. The assembly recited in claim 1 including a thermally conductive substrate, the reflector section being disposed between the liquid crystal molecule section and the thermally conductive substrate.

5. The assembly recited in claim 1 wherein each one of the electrode sections comprises interdigitated electrodes for producing an electric field between pairs of the interdigitated electrodes.

6. The assembly recited in claim 5 wherein the array of electrode sections is disposed in a plane.

7. The assembly recited in claim 6 wherein the electric field has components parallel to the plane.

8. The assembly recited in claim 6 including a thermally conductive substrate, the reflector section being disposed between the liquid crystal molecule section and the thermally conductive substrate.

9. The assembly recited in claim 7 including a thermally conductive substrate, the reflector section being disposed between the liquid crystal molecule section and the thermally conductive substrate.

10. The assembly recited in claim 1 wherein the array of electrode sections has a plurality of the stack of dielectric layers above the array.

11. The assembly recited in claim 1 wherein the array of electrode sections has a plurality of the stack dielectric layers below the array.

12. The assembly recited in claim 1 wherein the array of electrode sections has a plurality of the stack of dielectric layers above the array and a plurality of dielectric layers below the array.

13. An adaptive optics system, comprising:
   an adaptive optics assembly, comprising;
      a liquid crystal molecule section comprising liquid crystal molecules disposed between a pair of alignment layers;
      a reflector section, disposed on the liquid crystal molecule section, comprising a stack of dielectric layers having alternating higher and lower indices of refraction; and,
      an array of electrode sections disposed within the stack of dielectric layers; and
   a control section for producing electric signals across the array of electrode sections with magnitudes in accordance with a control signal fed to the control section, such electric signals producing electric fields passing through the liquid crystal molecules along a direction parallel to the array of the electrode sections to orientate the molecules in the a corresponding section of liquid crystal molecules in accordance with magnitudes of the control signal fed to the control section.

14. The adaptive optics system recited in claim 13 wherein the array of electrode sections is disposed between a pair of the dielectric layers, one of said pair of dielectric layers having a higher index than the other one of said pair of dielectric layers.

15. The adaptive optics system recited in claim 13 including a thermally conductive substrate, the reflector section being disposed between the liquid crystal molecule section and the thermally conductive substrate.

16. The adaptive optics system recited in claim 13 wherein each one of the electrode sections comprises interdigitated electrodes for producing an electric field between pairs of the interdigitated electrodes.

17. The adaptive optics system recited in claim 13 wherein the array of electrode sections is disposed in a plane.

18. The adaptive optics assembly recited in claim 17 wherein the electric field is has component parallel to the plane.

19. The adaptive optics system recited in 17 including a thermally conductive substrate, the reflector section being disposed between the liquid crystal molecule section and the thermally conductive substrate.

20. The adaptive optics system recited in recited in 18 including a thermally conductive substrate, the reflector section being disposed between the liquid crystal molecule section and the thermally conductive substrate.

21. The adaptive optics system recited in claim 13 including: a source of light, such light being directed though the adaptive optics assembly to a target; and a sensing system for detecting aberration of the light at the target and for producing the control signal the relative phase shift light to reduce the aberration of the light at the target.

* * * * *